United States Patent
Matsuo et al.

(10) Patent No.: US 11,193,335 B2
(45) Date of Patent: Dec. 7, 2021

(54) POLYCRYSTALLINE DIAMOND SINTERED MATERIAL TOOL EXCELLENT IN INTERFACIAL BONDING STRENGTH AND METHOD OF PRODUCING SAME

(71) Applicant: MITSUBISHI MATERIALS CORPORATION, Tokyo (JP)

(72) Inventors: Toshihiko Matsuo, Naka-gun (JP); Wardoyo Akhmadi Eko, Naka-gun (JP); Minoru Akaishi, Tsukuba (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 661 days.

(21) Appl. No.: 15/777,115

(22) PCT Filed: Nov. 21, 2016

(86) PCT No.: PCT/JP2016/084440
§ 371 (c)(1),
(2) Date: May 17, 2018

(87) PCT Pub. No.: WO2017/086485
PCT Pub. Date: May 26, 2017

(65) Prior Publication Data
US 2018/0371846 A1  Dec. 27, 2018

(30) Foreign Application Priority Data
Nov. 19, 2015 (JP) .............................. JP2015-226537

(51) Int. Cl.
*E21B 10/573* (2006.01)
*B22F 3/10* (2006.01)
(Continued)

(52) U.S. Cl.
CPC ........... *E21B 10/5735* (2013.01); *B01J 23/75* (2013.01); *B22F 3/10* (2013.01); *B22F 7/00* (2013.01);
(Continued)

(58) Field of Classification Search
CPC ......... E21B 10/5735; B01J 23/75; B22F 3/10; B22F 7/00; B22F 7/06; B22F 2005/001;
(Continued)

(56) References Cited

U.S. PATENT DOCUMENTS 3,745,623 A    7/1973  Wentorf, Jr. et al.
4,604,106 A    8/1986  Hall et al.
(Continued)

FOREIGN PATENT DOCUMENTS

CN    101104892 A    1/2008
CN    101321714 A    12/2008
(Continued)

OTHER PUBLICATIONS

Conversion chart of diamond and cobalt in volume percent to weight percent (Dec. 28, 2020) (Year: 2020).*
(Continued)

*Primary Examiner* — Pegah Parvini
*Assistant Examiner* — Ross J Christie
(74) *Attorney, Agent, or Firm* — Leason Ellis LLP

(57) ABSTRACT

A polycrystalline diamond sintered material tool includes: a cemented carbide substrate, which is mainly composed of WC and includes Co; and a diamond layer containing a metal catalyst made of Co provided on the cemented carbide substrate. The average layer thickness of a Co rich layer formed in an interface between the cemented carbide substrate and the diamond layer is 30 μm or less. $C_{MAX}/C_{DIA}$ is 2 or less when $C_{DIA}$ is an average content of Co included in the diamond layer and $C_{MAX}$ is a peak value of a Co content (Continued)

in the Co rich layer. $D/D_O$ is less than 2 when D is an average grain size of WC particles in a region from the interface between the cemented carbide substrate and the diamond layer to 50 μm toward an inside of the cemented carbide substrate; and $D_O$ is an average grain size of WC particles.

11 Claims, 7 Drawing Sheets

(51) Int. Cl.
| | | |
|---|---|---|
| B22F 7/06 | (2006.01) | |
| B23B 27/20 | (2006.01) | |
| C22C 29/08 | (2006.01) | |
| B23B 27/14 | (2006.01) | |
| B22F 7/00 | (2006.01) | |
| B23B 27/18 | (2006.01) | |
| B01J 23/75 | (2006.01) | |
| C22C 26/00 | (2006.01) | |
| C22C 29/06 | (2006.01) | |
| B22F 5/00 | (2006.01) | |
| C22C 1/05 | (2006.01) | |

(52) U.S. Cl.
CPC .............. *B22F 7/06* (2013.01); *B23B 27/14* (2013.01); *B23B 27/18* (2013.01); *B23B 27/20* (2013.01); *C22C 26/00* (2013.01); *C22C 29/067* (2013.01); *C22C 29/08* (2013.01); *B22F 2005/001* (2013.01); *B23B 2226/315* (2013.01); *C22C 1/05* (2013.01); *C22C 2204/00* (2013.01)

(58) Field of Classification Search
CPC ......... B23B 27/14; B23B 27/18; B23B 27/20; B23B 2226/315; C22C 1/05; C22C 26/00; C22C 29/067; C22C 29/08; C22C 2204/00
See application file for complete search history.

(56) References Cited

U.S. PATENT DOCUMENTS

| | | | |
|---|---|---|---|
| 4,694,918 A * | 9/1987 | Hall | ........................ E21B 10/56 |
| | | | 175/430 |
| 6,042,463 A | 3/2000 | Johnson et al. | |
| 6,315,065 B1 * | 11/2001 | Yong | ...................... E21B 10/573 |
| | | | 175/426 |
| 7,985,470 B2 * | 7/2011 | Kuroda | ................... C22C 26/00 |
| | | | 428/325 |
| 9,089,951 B2 | 7/2015 | Bao et al. | |
| 2009/0152017 A1 | 6/2009 | Shen et al. | |
| 2014/0069725 A1 | 3/2014 | Yu et al. | |
| 2016/0221080 A1 | 8/2016 | Higashi et al. | |
| 2017/0037687 A1 | 2/2017 | Mourik et al. | |

FOREIGN PATENT DOCUMENTS

| | | | |
|---|---|---|---|
| EP | 1384793 A2 | 1/2004 | |
| EP | 2108630 A1 | 10/2009 | |
| JP | 59-118802 A | 7/1984 | |
| JP | 60-094204 A | 5/1985 | |
| WO | WO-2008079205 A1 * | 7/2008 | ............. B24D 18/00 |
| WO | WO-2011/029773 A1 | 3/2011 | |
| WO | WO-2015/072250 A | 5/2015 | |

OTHER PUBLICATIONS

Indian Office Action dated Jul. 8, 2020 for the corresponding Indian Patent Application No. 201817020888.
Office Action dated Mar. 19, 2019 for the corresponding Chinese Patent Application No. 201680078632.7.
Mukhopadhyay et al., "Control of exaggerated tungsten carbide grain growth at the diamond-substrate interface of polycrystalline diamond cutters (PDC)", *Int. Journal of Refractory Metals and Hard Materials* 29, 2011, pp. 361-364.
International Search Report dated Feb. 14, 2017 for the corresponding PCT International Patent Application No. PCT/JP2016/084440.
European Search Report dated Jun. 11, 2019 for the corresponding European Patent Application No. 16866485.2.
Renliang Xu et al., "Comparison of sizing small particles using different technologies", *Powder Technology, Elsevier, Basel (CH)*, Jun. 24, 2003, pp. 145-153, vol. 132, No. 2-3, XP002711749, ISSN: 0032-5910, DOI: 10.1016/S0032-5910(03)00048-2.
European Office Action dated Mar. 12, 2021 for the corresponding European Patent Application No. 16866485.2.

* cited by examiner

POLYCRYSTALLINE DIAMOND SINTERED MATERIAL TOOL EXCELLENT IN INTERFACIAL BONDING STRENGTH AND METHOD OF PRODUCING SAME

CROSS-REFERENCE TO RELATED PATENT APPLICATIONS

This application is a U.S. National Phase Application under 35 U.S.C. § 371 of International Patent Application No. PCT/JP2016/084440 filed on Nov. 21, 2016 and claims the benefit of Japanese Patent Application No. 2015-226537, filed on Nov. 19, 2015, all of which are incorporated herein by reference in their entireties. The International Application was published in Japanese on May 26, 2017 as International Publication No. WO/2017/086485 under PCT Article 21(2).

FIELD OF THE INVENTION

The present invention relates to a polycrystalline diamond sintered material (hereinafter referred to "PCD" occasionally) tool excellent at the interface bonding strength between a cemented carbide substrate and a polycrystalline diamond layer, for example, a tool used for cutting nonferrous metals or for petroleum/natural gas/geothermal well drilling and the like and a method of producing the polycrystalline diamond sintered material tool.

BACKGROUND OF THE INVENTION

Conventionally, PCD tools excellent in hardness, chemical stability, abrasion resistance, and fracture resistance are used to cut non-ferrous metals, or for oil/natural gas/geothermal drilling to withstand the severe conditions of use.

In the conventional PCD tool, excellent abrasion resistance and fracture resistance were usually obtained by adjusting the content of the metal catalyst such as Co in the diamond sintered material.

Here, note that penetration of a metal catalyst such as Co into the diamond sintered material occurs by having the metal catalyst such as molted Co or the like move to fill the gaps between diamond particles using differential pressure as driving force, since pressure differs between gaps of diamond particles and the outside in sintering.

As a conventional production method of PCD, for example, the infiltration method is proposed in U.S. Pat. No. 3,745,623, and the premixing method is proposed in U.S. Pat. No. 4,604,106. In these methods, wear resistance and chipping resistance of PCD are adjusted by changing the content of metal catalyst such as Co in the diamond sintered material.

However, not only the abrasion resistance and fracture resistance of PCD but also the quality of interfacial bonding strength between PCD and cemented carbide material greatly affect the performance of PCD tool.

If the interfacial bonding strength is low, peeling or chipping of the PCD occurs due to occurrence of cracks or the like at the interface between the PCD and the cemented carbide substrate when a high load is placed on the PCD tool.

In view of this, in order to maintain the strength of the interface between the cemented carbide substrate and the diamond sintered material, it has been proposed to use the "non-planar" interfacial technology as shown in U.S. Pat. No. 6,042,463. In addition, a method has been proposed in which W particles are preliminarily added to the vicinity of the interface so that the WC particles of the cemented carbide substrate do not grow grains in Non-Patent Literature 1.

Non-Patent Literature

Non-Patent Literature 1: "Control of exaggerated tungsten carbide grain growth at the diamond-substrate interface of polycrystalline diamond cutters (PDC)" Int. Journal of Refractory and Hard Materials, 29 (2011) 361-364

Technical Problem

The PCD production by the infiltration method or the premixing method proposed in U.S. Pat. Nos. 3,745,623 and 4,604,106 is mainly performed to adjust the content of the metal catalyst such as Co in the diamond layer and the uniformity of the catalyst distribution. However, at the time of sintering, since the metal catalyst composed of Co or the like migrates from the cemented carbide substrate to the diamond layer, a metal catalyst rich layer is formed at the interface between the cemented carbide substrate and the diamond layer. Furthermore, along with the migration of the metal catalyst, the WC particles also partially migrate and abnormal growth of the WC particles occurs.

When PCD tools are used as cutting tools or drilling tools, high heat resistance is required depending on the use environment occasionally. However, if the metal catalyst rich layer exists at the interface between the cemented carbide substrate and the diamond layer, the interface bonding strength between the cemented carbide substrate and the diamond layer is reduced. Accordingly, problems such as cracking, peeling and the like at the interface occur when high load is subjected to the PCD tools.

SUMMARY OF THE INVENTION

Solution to Problem

Therefore, in order to solve the problems of the conventional PCD tools, the inventors of the present invention conducted intensive studies on measures to increase the interfacial bonding strength between the cemented carbide substrate and the diamond layer. "Cemented carbide" is a general term of the cemented carbides (Hart metalle, hard metals, Cemented Carbide) that is a composite material in which carbides of metals belonging one of groups IVa, Va, and VIa in the periodic table are sintered in the presence of ferrous metal such as Fe, Co, Ni and the like. In the present specification, the cemented carbide substrate is a cemented carbide substrate mainly composed of WC and containing Co, which is referred to as "WC based cemented carbide substrate" occasionally. The content of WC and Co in the WC-based cemented carbide substrate is 95 wt % or more with respect to the total weight of the WC-based cemented carbide substrate. Depending on its intended use, it may include a trace element such as Cr and the like at less than 5 wt %.

As a result, the inventors of the present invention found that: thickening of the Co rich layer formed at the interface between the cemented carbide substrate and the diamond layer can be suppressed; and abnormal growth of WC particles at the interface can be suppressed, by setting an ideal mixing amount of the metal catalyst powder made of Co which is mixed in advance in the diamond powder in sintering in an ultra-high pressure and high temperature apparatus in a state where the cemented carbide substrate and the diamond layer are laminated.

By suppressing the formation of a Co rich layer having an excessive layer thickness and suppressing abnormal growth of WC particles, the PCD tool of the present invention has not only improved heat resistance but also improved interfacial bonding strength. Accordingly, the impact resistance against impacting load from the side surface of the tool is improved and occurrence of cracks and peeling at the interface can be suppressed.

The present invention has been made based on the above findings, is directed to aspects described below.

(1) A polycrystalline diamond sintered material tool including: a cemented carbide substrate, which is mainly composed of WC and includes Co; and a diamond layer containing a metal catalyst made of Co provided on the cemented carbide substrate, wherein an average layer thickness of a Co rich layer formed in an interface between the cemented carbide substrate and the diamond layer is 30 μm or less.

(2) The polycrystalline diamond sintered material tool according to the above-described (1), wherein a value of $C_{MAX}/C_{DIA}$ is 2 or less when $C_{DIA}$ is defined as an average content of Co included in the diamond layer and $C_{MAX}$ is defined as a peak value of a Co content in the Co rich layer.

(3) The polycrystalline diamond sintered material tool according to the above-described (1) or (2), wherein a value of $D/D_O$ is less than 2 when D is defined as average grain size of WC particles in a region from the interface between the cemented carbide substrate and the diamond layer to 50 μm toward an inside of the diamond layer; and $D_O$ is defined as an average grain size of WC particles in the inside of the cemented carbide substrate.

(4) The polycrystalline diamond sintered material tool according to the above-described (1), wherein a value, in which an average content of Co in the cemented carbide substrate is subtracted from a Co mixed amount, is from 1% by mass to 30% by mass, the Co mixed amount being a Co amount mixed in the diamond layer prior to sintering.

(5) The polycrystalline diamond sintered material tool according to the above-described (4), wherein a value, in which an average content of Co in the cemented carbide substrate is subtracted from a Co mixed amount, is from 10% by mass to 30% by mass, the Co mixed amount being a Co amount mixed in the diamond layer prior to sintering.

(6) The polycrystalline diamond sintered material tool according to the above-described (5), wherein a value, in which an average content of Co in the cemented carbide substrate is subtracted from a Co mixed amount, is from 16% by mass to 28% by mass, the Co mixed amount being a Co amount mixed in the diamond layer prior to sintering.

(7) The polycrystalline diamond sintered material tool according to any one of the above-described (4) to (6), further including a buffer layer with an average layer thickness of 5 μm or more and 15 μm or less at the interface between the Co rich layer and the cemented carbide substrate.

(8) The polycrystalline diamond sintered material tool according to any one of the above-described (4) to (6), further including a buffer layer with an average layer thickness of 8 μm or more and 15 μm or less at the interface between the Co rich layer and the cemented carbide substrate.

(9) The polycrystalline diamond sintered material tool according to the above-described (8), wherein the average layer thickness of the Co rich layer is 21 μm or more.

(10) The polycrystalline diamond sintered material tool according to the above-described (7), wherein an average layer thickness of the diamond layer is from 0.5 mm to 15 mm, the diamond layer is formed directly on the Co rich layer, the Co rich layer is formed directly on the buffer layer, and the buffer layer is formed directly on the cemented carbide substrate.

(11) A method of producing the polycrystalline diamond sintered material tool according to any one of the above-described (1) to (10), the method including the steps of: laminating a diamond raw material powder, in which 15-33% by mass of a Co powder is mixed in a diamond powder having an average grain size of 1-11 μm, on a cemented carbide substrate, which contains 9-18% by mass of Co and WC particles having an average grains size of 0.5-4 μm to have a laminate; and sintering the laminate in a condition of 5 GPa or more of a sintering pressure and 1400° C. or more of a sintering temperature in an ultra-high-pressure and temperature apparatus, the condition corresponds to a region in which diamond is thermodynamically stabilized.

Hereinafter, the present invention will be described in detail.

FIG. 1 shows a schematic diagram of an ultra-high pressure and high temperature apparatus for producing a polycrystalline diamond sintered material (PCD) tool of the present invention.

For example, the PCD tool of the present invention is produced by laminating the diamond raw material powder (8) in which a predetermined Co powder is mixed in the diamond powder having a predetermined average grain size, the cemented carbide substrate (1) containing a predetermined amount of Co and WC particles having a predetermined average grain size, the Ta foil (6), and the graphite disc (2) upward in the order from the bottom part of the Ta capsule (9); and further laminating the Ta foil (6), the cemented carbide substrate (1) and the diamond raw material powder (8) above as shown in FIG. 1. Then, by performing ultra-high pressure and high temperature sintering in the region where diamond is thermodynamically stabilized in the state where the materials for sintering are laminated in the Ta capsule as described above, the PCD tool of the present invention is produced. Specifically, the region where diamond is thermodynamically stabilized means that the pressure is 5 GPa-10 GPa and the sintering temperature is 1400° C. to 2200° C.

When the sintering pressure is less than 5 GPa in sintering by the ultra-high pressure and high temperature apparatus, since the diamond is not in the stable region at the above-described predetermined sintering temperature, diamond is inversely converted into graphite and a sintered material having a high hardness cannot be obtained. Therefore, the sintering pressure needs to be 5 GPa or more. However, but its effect is sufficient if it is 10 GPa or less. Having sintering pressure more than 10 GPa leads to a higher cost of the apparatus. Thus, it is desirable that the pressurizing pressure is set to 5 to 10 GPa.

When the sintering temperature is lower than 1400° C., Co or the like as the metal catalyst does not sufficiently dissolve and it leads to un-sintered or insufficiently sintered state, and the densification of the sintered material cannot be obtained. Thus, the sintering temperature need to be 1400° C. or more. On the other hand, when the sintering temperature exceeds 2200° C., since it is not the stable region of diamond at the above-described predetermined sintering pressure, it is over-sintered and a phenomenon occurs in which diamond particles become graphite. In addition, since the layer thickness of the Co rich layer at the interface between the cemented carbide substrate and the diamond layer becomes too thick and abnormal growth of WC particles occurs. Accordingly, it is desirable that the sintering temperature is 1400° C. or more and 2500° C. or lower, preferably 1450° C. or more and 2000° C. or less.

Co rich layer at the interface between the cemented carbide substrate and the diamond layer:

FIG. 6 shows a schematic vertical sectional view of the PCD tool according to an embodiment of the present invention. According to the present embodiment, it is important to set the Co content included in the cemented carbide substrate, the Co content premixed in the diamond powder, the average grain size of the diamond powder and the average grain size of the WC particles in the cemented carbide substrate within predetermined ranges, in order to suppress the thickness of the Co rich layer (19) formed at the interface between the cemented carbide substrate (17) and the diamond layer (18) within an appropriate range and to suppress the abnormal growth of the WC particles at the interface.

A preferable average layer thickness of the diamond layer (18) is 0.5 mm to 15 mm. If the average layer thickness is less than 0.5 mm diamond layer (18), the thickness of the diamond layer becomes insufficient. In that case, when it is used as a tool, wear reaches to the cemented carbide substrate in a short period of time and wear proceeds rapidly. As a result, the service life of the tool is shortened. On the other hand, when the average layer thickness of the diamond layer (18) exceeds 15 mm, the production cost increased without any further improvement of its performance A preferable average layer thickness of the diamond layer (18) is 1.0 mm to 10 mm, and more preferably it is 2.0 mm to 8.0 mm.

FIG. 7 shows a schematic vertical sectional view of the PCD tool according to another embodiment of the present invention. In this case, a buffer layer (20) is further formed at the interface between the Co rich layer (19) and the cemented carbide substrate (17).

In the PCD tool according to another embodiment of the present invention shown in FIG. 7, the value obtained by subtracting the average Co content in the cemented carbide substrate (17) from the mixing amount of Co mixed in the diamond layer (18) before sintering is set within the range of 1% by mass to 30% by mass. When this value is less than 1% by mass, no buffer layer is formed, and when it exceeds 30% by mass, the Co content included in the diamond layer becomes too high, so that wear performance is remarkably deteriorated. Accordingly, in this case, when it is used as a tool, the performance of the PCD tool is degraded.

The boundary line of the buffer layer (20) is defined as follows. As described above, the buffer layer (20) is formed at the interface between the Co rich layer (19) and the cemented carbide substrate (17). The boundary line between the Co rich layer (19) and the buffer layer (20) is such that the Co content increasing once to the $C_{MAX}$ value in the Co rich layer (19) decreases toward the cemented carbide base (17) and becomes less than the value of $1.1 \times C_{DIA}$. The borderline between the buffer layer (20) and the cemented carbide substrate (17) is such that the Co content decreases toward the cemented carbide substrate (17) side in the buffer layer (20) and becomes the average Co content $C_{WC}$ included in the cemented carbide substrate (17).

The average layer thickness of the buffer layer (20) can be obtained by measuring the distance between the above-described boundary lines in a layer thickness direction at multiple points.

Therefore, change in the Co content from the interface between the diamond layer (18) and the cemented carbide substrate (17) towards the cemented carbide substrate (17) is not reduced abruptly, and rather is gradually reduced unidirectionally in approximately proportional to the thickness distance of the buffer layer (20). Here, "reduced unidirectionally" means that it continues to decrease from the Co rich layer (18) side of the buffer layer to the cemented carbide substrate (17) side without increasing the Co content (excluding increase as local noise in the microscopic observation).

By having the above-described gradual decrease of the Co contents between the diamond layer (18) and the WC-based cemented carbide substrate (17), which have different physical properties, from the diamond layer (18) toward the WC-based cemented carbide substrate (17), the extent of change of physical properties due to differences of structures and compositions becomes gradual.

By further having the buffer layer (20) formed at the interface between the Co rich layer (19) and the cemented carbide substrate (17), the interface bonding strength can be further improved. For example, occurrence of peeling of the diamond layer (18) due to instantaneous impact can be suppressed.

The occurrence of peeling of the diamond layer (18) due to this instantaneous impact can be evaluated by the impact shear strength test shown in FIGS. 9 and 10 by using the test piece shown in FIG. 8.

A more preferable range of the value obtained by subtracting the average Co content in the cemented carbide substrate (17) from the mixing amount of Co mixed in the diamond layer (18) before sintering is from 10% by mass to 30% by mass. Even more preferably, it is 16% by mass to 28% by mass.

When sintered, the mixed amount of Co mixed in the diamond layer (18) before sintering changes. In the case where the value obtained by subtracting the average Co content in the cemented carbide substrate (17) from the mixing amount of Co mixed in the diamond layer (18) before sintering is set to 1% by mass to 30% by mass and sintering is performed in the above-described conditions, the value obtained by subtracting the average Co content in the cemented carbide substrate (17) after sintering from the mixing amount of Co mixed in the diamond layer (18) becomes −5% by mass to 25% by mass.

The preferred average layer thickness of the buffer layer (20) is 5 μm to 15 μm. And more preferably it is 8 μm to 15 μm. Even more preferably, it is 8 μm to 10 μm. When the average layer thickness of the buffer layer (20) is less than 5 μm, impact performance is reduced, there is no effect of improving impact resistance possessed by the buffer layer. On the other hand, if the average layer thickness of the buffer layer (20) exceeds 15 μm, it becomes necessary that the value obtained by subtracting the average Co content in the cemented carbide substrate (17) from the mixing amount of Co mixed in the diamond layer (18) before sintering is set to more than 30% by mass. Accordingly, the Co content included in the diamond layer becomes excessive for the wear resistance performance to be reduced.

The gradient of decrease in the Co content in the buffer layer (20) is in the range of 1% by mass/μm to 10% by mass/μm. More preferably, it is in the range of 1.5% by mass/μm to 7.5% by mass/μm. Even more preferably, it is in the range of 2% by mass/μm to 5% by mass/μm.

In terms of the average layer thickness of the Co rich layer (19) formed at the interface between the cemented carbide substrate (17) and the diamond layer (18), if it exceeds 30

μm, the interface strength is reduced. As a result, problems such as cracking, peeling, and the like occurs at the interface. Therefore, the average layer thickness of the Co rich layer (19) is 30 μm or less. Preferably, it is set to 20 μm or less.

Here, the average layer thickness of the Co rich layer (19) is defined as described below. The average layer thickness of the Co rich layer (19) is obtained by measuring the Co contents from the interface between the cemented carbide substrate (17) and the diamond layer (18) toward each of inside directions of the cemented carbide substrate and the diamond layer in the distance of 50 μm each (100 μm for both of the cemented carbide substrate and the diamond layer total). $C_{DIA}$ is defined as the average Co content included in the post-sintering diamond layer, meaning that the Co content is the amount of Co resided as metal catalysts after sintering in the region excluding the Co rich layer. The distance between interfaces with the cemented carbide substrate and the diamond layer, both of which are defined as a point where the measured Co content becomes $1.1 \times C_{DIA}$ or more, are measured at multiple different points. By averaging the obtained multiple values, the average layer thickness of the Co rich layer (19) is obtained.

In the present specification, it is preferable that the value $C_{MAX}/C_{DIA}$, which is a ratio of $C_{MAX}$ to $C_{DIA}$, is 2 or less in the case where $C_{MAX}$ is defined as the peak value of the Co content in the Co rich layer (19) and $C_{DIA}$ is defined as the average Co content included in the diamond layer (18). This is because if the value of $C_{MAX}/C_{DIA}$ exceeds 2, even when the layer thickness of the Co rich layer (19) is thin (the average layer thickness is 30 μm or less), the concentration change rate of the Co content at the interface between the cemented carbide substrate (17) and the diamond layer (18) increases very rapidly. Accordingly, the effect of improving the interface strength obtained by thinning the Co rich layer (19) is reduced. Therefore, it is desirable that the value of $C_{MAX}/C_{DIA}$ is set to 2 or less in the Co rich layer (19).

The measurement of the Co contents from the diamond layer (18) to the interface between the cemented carbide substrate (17) and the diamond layer (18) (meaning $C_{MAX}$ and $C_{DIA}$) can be performed by the line analysis with an EPMA (Electron Probe MicroAnalyzer), for example. For example, as shown in FIGS. 3 and 4, by scanning the distance of about 100 μm from the diamond layer toward the cemented carbide substrate (about 50 μm each for each of the diamond layer and the cemented carbide substrate) with a 20 μm of the beam diameter and 0.5 μm of the measurement interval; detecting the characteristic X-ray of Co generated by the accelerated electron beam radiated from the EPMA; and obtaining the Co contents as the count numbers (unit: cps, count per second, the count number of X-ray per 1 second) at each position, the values of $C_{MAX}$ and $C_{DIA}$ can be obtained.

The value of the average content Co content $C_{DIA}$ included in the diamond layer (18) does not change significantly due to the existence of the Co rich layer (19). It is a value measured as an almost constant value in which the Co content (count number) is kept in a range of plus/minus 6%.

The value of $C_{DIA}$ is defined as the average values measured at least at 200 different points with 0.5 μm measurement intervals in the layer direction of the diamond layer (18) from the point beyond the Co rich layer (19) to the diamond layer (18) side.

For example, in the line analysis of the PCD tool (H) of the present invention shown in FIG. 3, the count number of the Co content in the diamond layer which is approximately 30 μm or more away from the interface between the diamond layer and the cemented carbide substrate is 5914 plus/minus 6%, The value of $C_{DIA}$ in the PCD tool (H) of the present invention is 5914.

On the other hand, in the line analysis of the comparative PCD tool (G) shown in FIG. 4, the Co content in the diamond layer, which is approximately 50 μm or more away from the interface between the diamond layer and the cemented carbide substrate, is 3907 plus/minus 6%. As a result, the value of $C_{DIA}$ in the comparative PCD tool (G) is 3907.

The value of $C_{WC}$ of the cemented carbide substrate is defined as the average values measured at least at 200 different points with 0.5 μm measurement intervals in the layer direction of the cemented carbide substrate (17) from the point further 50 μm ahead beyond the Co rich layer (19) to the cemented carbide substrate (17).

The value of the average content $C_{WC}$ of Co included in the cemented carbide substrate (17) does not change significantly due to the existence of the buffer layer (20). It is a value measured as an almost constant value in which the Co content (count number) is kept in a range of plus/minus 6%.

WC crystal grain at the interface between the cemented carbide substrate and the diamond layer:

The average grain size of the WC particles in the Co rich layer region formed at the interface between the cemented carbide substrate (17) and the diamond layer (18) is defined as D, and the average grain size of the WC particles inside the cemented carbide substrate is defined as $D_O$. If the value of $D/D_O$ is 2 or more, the interface strength between the cemented carbide substrate (17) and the diamond layer (18) is reduced due to the abnormal growth of the WC particles in region of the Co rich layer near the interface. Accordingly, it becomes easy for cracking and peeling to occur when high load is subjected on the PCD tool. Thus, the value of $D/D_O$ is set to less than 2.

Measurement of the grain size of the WC particles is—carried out by image processing of SEM (scanning electron microscope) photograph observed at 500 times to 3000 times (using software, Image J Ver: 1.49 manufactured by National Institute of Health). The average grain size of the WC particles can be obtained by averaging the measured values at these multiple points.

The PCD tool of the present invention, in which the average layer thickness of the Co rich layer (19) is 30 μm or less, the ratio value of $C_{MAX}$ which is the peak value of the Co content in the Co rich layer (19) to the average Co content in the diamond layer (18) $C_{DIA}$, $C_{MAX}/C_{DIA}$ is 2 or less, and the average grain size D of the WC particles in the Co rich layer satisfies $D/D_O<2$, can be produced by: preparing the cemented carbide substrate including 9-18% by mass of Co and the WC particles having the average grain size of 0.5-4 μm; laminating the diamond raw material powder, in which 15-33% by mass of the Co powder is mixed in the diamond powder having the average grain size of 1-11 μm as metal catalysts, on the cemented carbide substrate; and sintering the lamination in the ultra-high pressure and high temperature apparatus.

If the Co content in the cemented carbide substrate (17) is less than 9% by mass, the sintered property of the cemented carbide is poor and the toughness of the cemented carbide substrate (17) itself is lowered because the binding phase component is less. On the other hand, if the Co content exceeds 18% by mass, the layer thickness of the Co rich layer (19) formed at the interface between the cemented carbide substrate (17) and the diamond layer (18) exceeds 30 μm. Thus, the interface bonding strength between the cemented carbide substrate (17) and the diamond layer (18) decreases. Accordingly, when high load is subjected on the PCD tool, cracking, peeling and the like occur at the interface.

Therefore, the Co content in the cemented carbide substrate (17) is set to 9 to 18% by mass.

In addition, if the average grain size of the WC particles in the cemented carbide substrate (17) is less than 0.5 μm, it becomes easy for WC particles in the cemented carbide substrate grain to grow. Accordingly, mechanical properties such as the fracture toughness value are deteriorated, and it becomes easy for the PCD itself to be cracked.

On the other hand, if the average grain size exceeds 4 μm, although it is possible to increase the fracture toughness value, its hardness is lowered. Accordingly, it becomes easy for the PCD tool to be deformed (warped) in PCD sintering. Therefore, the average grain size of the WC particles in the cemented carbide substrate (17) is set to 0.5-4 μm.

If the average grain size of the diamond powder forming the diamond layer (18) is less than 1 μm, it becomes easy for the diamond particles to grow abnormally. Accordingly, the wear resistance of the PCD tool is lowered. On the other hand, if the average grain size exceeds 11 μm, it become easy for the diamond particles to be fallen off when high load is subjected on the PCD tool. In addition, the surface roughness of the workpiece is deteriorated. Therefore, the average grain size of the diamond powder is set to 1-11 μm.

Furthermore, the Co powder as metal catalyst is mixed in the diamond raw material powder. If the mixed amount of Co is less than 15% by mass, the diffusion rate of Co from the cemented carbide substrate (17) to the diamond layer (18) become fast in sintering in the ultra-high pressure and high temperature apparatus. As a result, an excessively thick Co rich layer (19) is formed at the interface between the WC-based cemented carbide substrate (17) and the diamond layer (18) for the interface properties to be deteriorated. On the other hand, if the mixed amount of Co exceeds 33% by mass, a matrix of Co is partially formed in the diamond layer and direct bonding between each of the diamond powder is inhibited. Accordingly, the wear resistance and the fracture resistance of the diamond layer are lowered.

Thus, the mixed amount of Co mixed in the diamond layer in advance is set to 15-33% by mass.

By inserting and laminating the above-described cemented carbide substrate (1) and diamond raw material powder (8) in the Ta capsule; and performing sintering in the condition of 5 GPa or more of sintering pressure and 1400° C.-2200° C. of the sintering temperature, which corresponds to the region where diamond is thermodynamically stabilized, in the ultra-high pressure and high temperature apparatus, the PCD tool of the present invention can be produced.

The PCD tool of the present invention is applicable to tools of various shapes and uses. For example, it can be cut out from a planar laminate and brazed to a tool base for use. It can also be used as a drill bit insert produced by laminating and sintering a diamond layer at the tip of a cylindrical tool base having a hemispherical tip. Furthermore, it can also be used for cutting edge portions of rotating tools having complicated shapes such as drills and end mills.

Advantageous Effects of Invention

In the PCD tool of the present invention, in addition to the excellent hardness and chemical stability possessed by the normal PCD tool, the interface strength is improved by suppressing thickening of the average layer thickness of the Co rich layer formed at the interface between the cemented carbide substrate and the diamond layer and suppressing the abnormal growth of the WC particles in the Co rich layer.

Therefore, when the PCD tool of the present invention is used as a nonferrous metal cutting tool, or as a tool for petroleum/natural gas/geothermal well drilling and the like, the shock resistance against impacting load from side face of the tool is improved and the occurrence of cracking, peeling or the like at the interface is suppressed by having the improved interface bonding strength. Accordingly, the service life of the tool can be prolonged.

Further, according to the present invention, a PCD tool, which has an improved interface strength between the cemented carbide substrate and the diamond layer, an improved impact resistance, and less occurrence of cracking, peeling and the like at the interface, can be produced by a simple method of sintering in the ultra-high pressure and high temperature apparatus while the Co content in the cemented carbide substrate, the average grain size of the WC particles, the mixed amount of C mixed in the diamond raw powder as metal catalyst and the average grain size of the diamond powder are appropriately adjusted.

In addition, according to the present invention, an intermediate layer having physically intermediate properties is not laminated between the diamond layer and the cemented carbide substrate at the time of sintering, which is required for the cemented carbide substrate. Thus, it is possible to obtain a sintered material tool having excellent wear resistance, fracture resistance and high interface bonding strength between the cemented carbide substrate and the diamond layer even if the outermost diamond layer is directly laminated and produced into a sintered material tool.

DETAILED DESCRIPTION OF THE INVENTION

The present invention will be described in detail below by way of examples.

Example

Table 1 shows combinations of cemented carbide and diamond raw material powders used in Examples. As representative Examples of the present invention, the PCD tools (E), (F), (H), (I) and (J), each of which was made of one of combinations of the cemented carbide and diamond raw material powders shown in Table 1 as (E), (F) and (H), were prepared.

Figure 1:
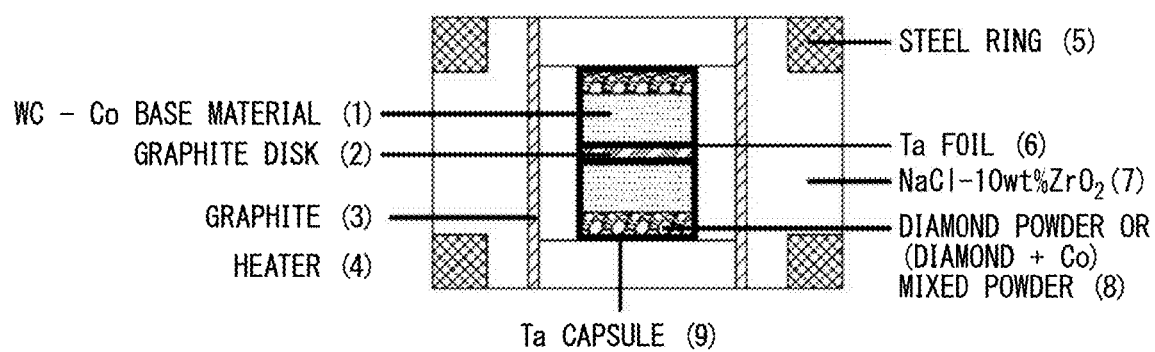
FIG. 1 shows a schematic diagram of an ultra-high pressure and high temperature apparatus for producing a PCD tool.

Specifically, the PCD tool (E) was prepared by mixing diamond raw material powder in which 17% by mass of Co powder was mixed in the diamond powder having the average grain size of 9 μm; and the diamond raw material powder having the Co content of 16% by mass. As shown in FIG. 1, the cemented carbide substrate (see Table 1 (E) composed of WC particles of 2.2 μm was packed in the Ta capsule and sintered at the pressure of 5.8 GPa and the sintering temperature of 1500° C. in the ultra-high pressure and high temperature apparatus.

The PCD tool (F) was prepared by: inserting the diamond raw material powder, in which 31% by mass of the Co powder was mixed in the diamond powder having the average grain size of 9 μm, and the cemented carbide substrate (refer (F) in Table 1), which has the Co content of 16% by mass and was made of WC particles having the average grain size of 2.2 μm, in the state where they were laminated in the Ta capsule as shown in FIG. 1; and sintering the laminate in the sintering pressure of 5.8 GPa at the sintering temperature of 1500° C. in the ultra-high pressure and high temperature apparatus.

In addition, the PCD tool (H) was prepared by: inserting the diamond raw material powder, in which 33% by mass of the Co powder was mixed in the diamond powder having the average grain size of 3 μm, and the cemented carbide substrate (refer (H) in Table 1), which has the Co content of 10% by mass and was made of WC particles having the average grain size of 2.2 μm, in the state where they were laminated in the Ta capsule as shown in FIG. 1; and sintering the laminate in the sintering pressure of 5.8 GPa at the sintering temperature of 1500° C. in the ultra-high pressure and high temperature apparatus.

In addition, the PCD tool (I) was prepared by: inserting the diamond raw material powder, in which 33% by mass of the Co powder was mixed in the diamond powder having the average grain size of 6 μm, and the cemented carbide substrate (refer (I) in Table 1), which has the Co content of 10% by mass and was made of WC particles having the average grain size of 2.2 μm, in the state where they were laminated in the Ta capsule as shown in FIG. 1; and sintering the laminate in the sintering pressure of 5.8 GPa at the sintering temperature of 1500° C. in the ultra-high pressure and high temperature apparatus.

In addition, the PCD tool (J) was prepared by: inserting the diamond raw material powder, in which 33% by mass of the Co powder was mixed in the diamond powder having the average grain size of 9 μm, and the cemented carbide substrate (refer (J) in Table 1), which has the Co content of 10% by mass and was made of WC particles having the average grain size of 2.2 μm, in the state where they were laminated in the Ta capsule as shown in FIG. 1; and sintering the laminate in the sintering pressure of 5.8 GPa at the sintering temperature of 1500° C. in the ultra-high pressure and high temperature apparatus.

TABLE 1

| | Diamond layer | | WC-Co layer | |
| --- | --- | --- | --- | --- |
| Sample name | Average grain size of diamond (μm) | Mixed amount of Co (% by mass) | Average grain size of WC (μm) | Co content (% by mass) |
| A | 3 | — | 0.9 | 10 |
| B | 3 | — | 3.3 | 10 |
| C | 3 | — | 2.2 | 16 |
| D | 9 | — | 2.2 | 16 |
| E | 9 | 17 | 2.2 | 16 |
| F | 9 | 31 | 2.2 | 16 |
| G | 3 | — | 2.2 | 16 |
| H | 3 | 33 | 2.2 | 10 |
| I | 6 | 33 | 2.2 | 10 |
| J | 9 | 33 | 2.2 | 10 |

Among the PCD tools (E), (F), (H), (I), and (J) of Examples of the present invention which were prepared as described above, the PCD tools (E) and (F) were chosen, subjected to scanning electron microscope (SEM) observation, and the vicinity of the interfaces between the cemented carbide substrates and the diamond layers were observed. The obtained SEM images are shown in FIG. 2 in the panels (E) and (F), respectively.

Figure 2:
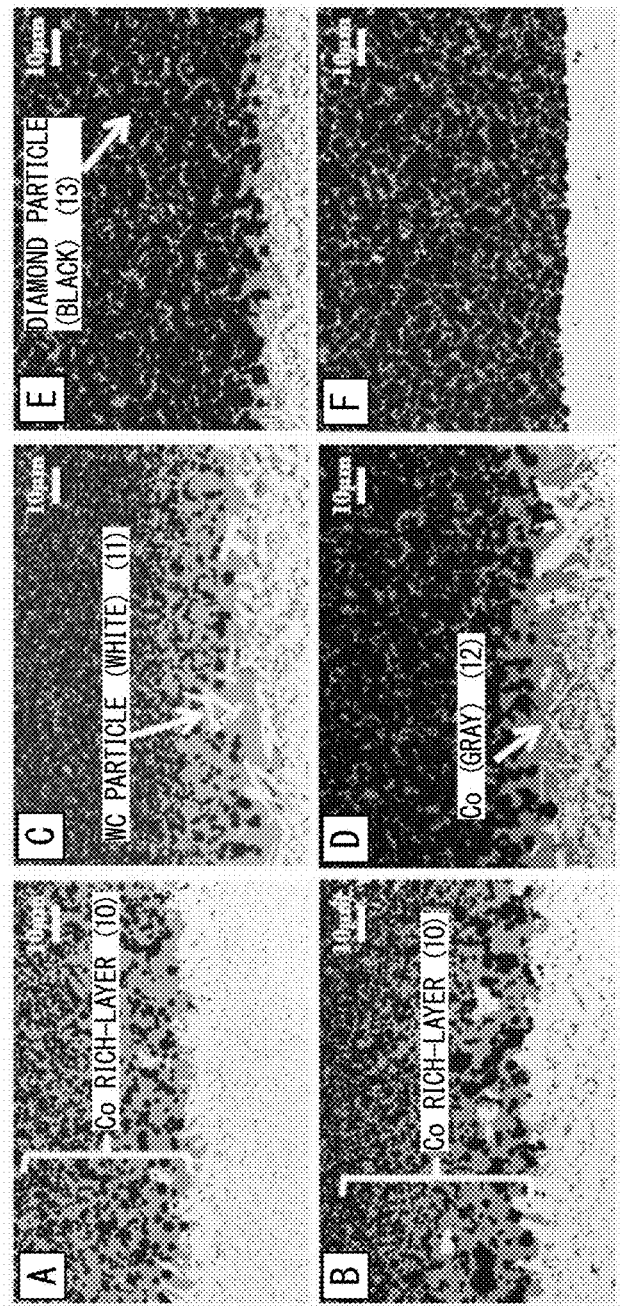
FIG. 2 shows an example of SEM images of the interface between the cemented carbide substrate and the diamond layer in PCD tools. The panels (A) to (D) show PCD tools of Comparative Examples, and the panels (E) and (F) show the PCD tools of Example of the present invention.

As apparent from the panel (E) and (F) in FIG. 2, in the PCD tool (E) of Example of the present invention, the average layer thickness of the Co rich layer formed at the interface between the cemented carbide substrate and the diamond layer was less than 10 μm or less; and the existence of the Co rich layer was not confirmed at the interface between the cemented carbide substrate and the diamond layer in the PCD tool (F) of Example of the present invention.

Table 2 shows the average layer thickness values of the Co rich layers measured in the PCD tools (E), (F), (H), (I) and (J) of Example of the present invention.

Figure 3:
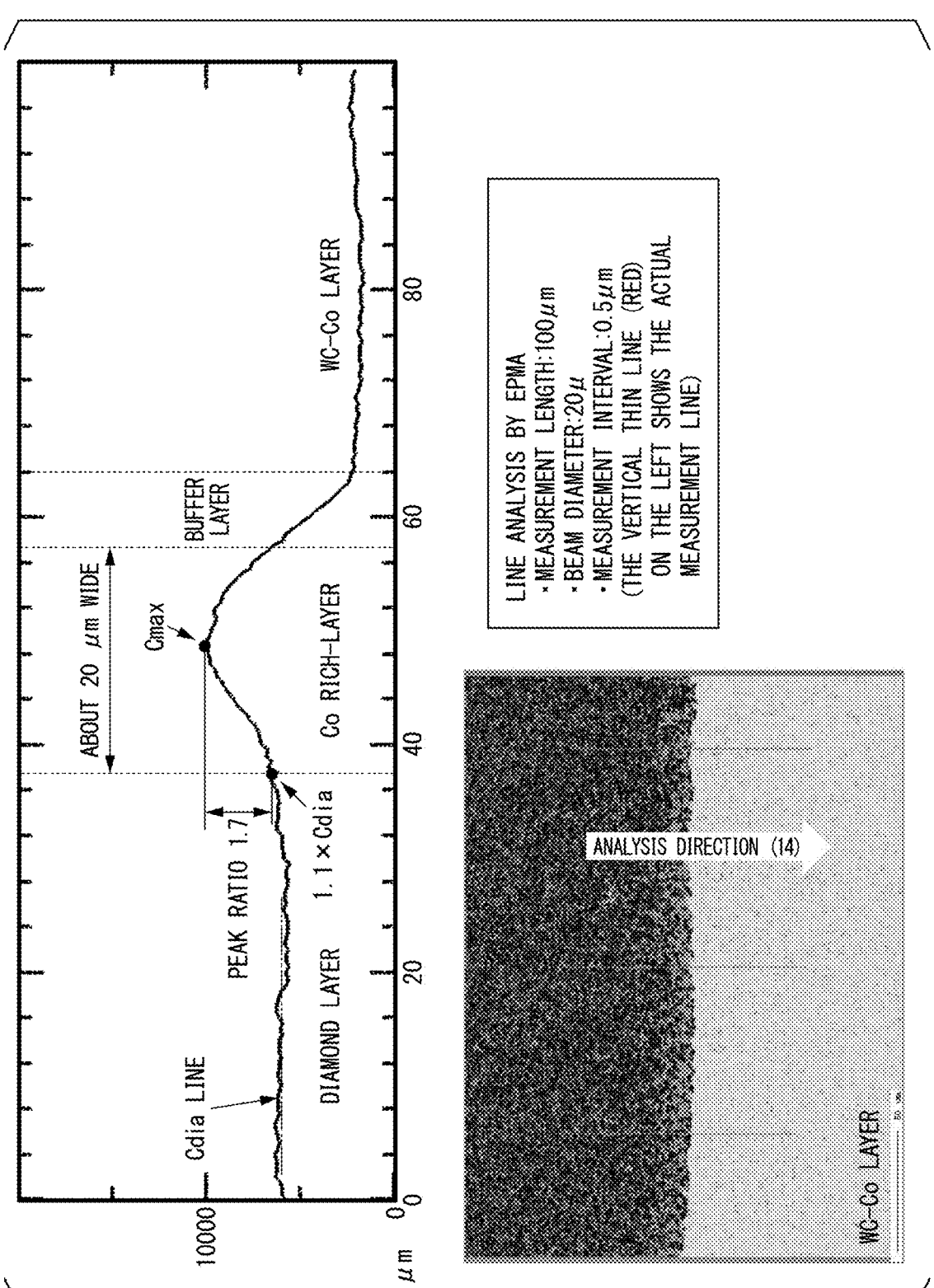
FIG. 3 shows a schematic explanatory view and analytical result of a line analysis of the Co content carried out on the PCD tool (H) of Example of the present invention.

The average layer thickness of the Co rich layer was obtained as explained below. First, the Co content ($C_{DIA}$) was measured on the distance of about 100 μm from the diamond layer toward the cemented carbide substrate (about 50 μm for each of the diamond layer and the cemented carbide substrate) by performing a line analysis with EPMA (Electron Probe MicroAnalyzer) with 20 μm of the beam diameter and 0.5 μm of the measurement intervals, as shown in FIG. 3 (corresponding to the PCD tool (H) of Example of the present invention), for example. Then, the region having the value of the Co content of $1.1 \times C_{DIA}$ or more was defined as the Co rich layer and the layer thickness of the region was measured. After measuring the layer thickness of the Co rich layer at multiple different points, by averaging the obtained multiple values, the average layer thickness of the Co rich layer was obtained.

$C_{DIA}$ is the Co content resided in the diamond layer as metal catalysts after sintering. In addition, the peak value $C_{MAX}$ of the Co content in the Co rich layer was measured;

and the value of $C_{MAX}/C_{DIA}$, which was the ratio of $C_{MAX}$ to the average Co content in the diamond layer $C_{DIA}$ was calculated.

From Table 2, it was demonstrate that the average layer thickness of the Co rich layer was 30 μm or less and the value of $C_{MAX}/C_{DIA}$ was 2 or less in all of the PCD tools (E), (F) and (H) of Examples of the present invention. In addition, from FIG. 3, it was demonstrated that the layer thickness of the Co rich layer was about 28 μm and the value of $C_{MAX}/C_{DIA}$ was 1.7.

The average layer thickness of the diamond layer was obtained by measuring the distance from the boundary line between the diamond layer and the Co rich layer to the outermost surface of the diamond layer at multiple points in the layer thickness direction and calculating the average value from the measured values.

The average layer thicknesses of the diamond layer of the PCD tools (E), (F), (H), (I) and (J) of Example of the present invention were within the range of 5.0 mm to 8.0 mm.

The values of the average layer thicknesses of the buffer layers measured in the PCD tools (E), (F), (H), (I), and (J) of Examples of the present invention were also shown.

The average layer thickness of the buffer layer was obtained by measuring the distance between the boundary lines of the buffer layer at multiple points in the layer thickness direction and calculating the average value from the measured values.

The average layer thicknesses of the buffer layers of the PCD tools (E), (F), (H), (I) and (J) of Examples of the present invention were within the range of 5 μm to 9 μm.

Further, with respect to the PCD tools (E), (F), (H), (I) and (J) of Examples of the present invention, the average grain size D of the WC particles in the region from the interface to 50 μm inside of the diamond layer were obtained by: observing the region from the interface between each of the cemented carbide substrates and the diamond layers to 50 μm inside of the diamond layer by SEM (scanning electron microscope) with a magnification of 500 to 3000 times; measuring the grain sizes of WC particles in the region using the image processing of the observed SEM pictures (using software, ImageJ Ver: 1.49, provided by the National Institute of Health, USA); and averaging the measurement values obtained in different multiple points.

In addition, the average grain size $D_O$ of the WC particles inside the cemented carbide substrate was obtained in the same manner, and the value of D/DO was calculated.

Table 2 shows the results obtained from the interface between the respective cemented carbide substrates and the diamond layers obtained in the PCD tools (E), (F), (H), (I) and (J) of Examples of the present invention. The value of the average particle diameter D of the WC particles in the region from the interface between each of the cemented carbide substrates and the diamond layers to 50 μm inside of the diamond layer; the value of the average particle diameter $D_O$ of the WC particles inside the cemented carbide substrate; and the value of $D/D_O$ were shown.

From Table 2, it was demonstrated that the value of $D/D_O$ was less than 2 in all of the PCD tools (E), (F), (H), (I), and (J) of Examples of the present invention.

For comparison, PCD tools (A) to (D) and (G) of Comparative Examples were produced by combining the cemented carbide and the diamond raw material powder shown as (A) to (D) and (G) in Table 1.

The sintering pressure and the sintering temperature of the PCD tools (A) to (D) and (G) of Comparative Examples were 5.8 GPa and 1500° C., respectively, The same sintering conditions as the PCD tools of (E), (F) and (H) of Examples of the present invention were used.

Among the PCD tools (A) to (D) and (G) of Comparative Examples, which were prepared as described above, the PCD tools (A) to (D) were chosen, subjected to scanning electron microscope (SEM) observation, and the vicinity of the interfaces between the cemented carbide substrates and the diamond layers were observed. The obtained SEM images are shown in FIG. 2 in the panels (A) to (D), respectively.

From the panels (A) to (D) in FIG. 2, it was demonstrated that the Co rich layer having the average layer thickness of 50 μm or more (FIG. 1, (A) and (B); or the Co rich layer having the average layer thickness more than 30 μm (FIG. 1, (C) and (D), was formed at the interface between the cemented carbide substrate and the diamond layer in the PCD tools (A) to (D) of Comparative Examples, in which the Co powder was not premixed in the diamond powder.

Further, in the PCD tools (A) to (D), (G) of Comparative Examples, WC particles, in which the grain sizes were abnormally grown, were observed in the region form the interface between the cemented carbide substrate and the diamond layer to 50 μm inside of the diamond layer.

From comparison between panels (A) to (D) in FIG. 2, it was demonstrated that: the layer thickness of the Co rich layer was thickened for the WC particles to grow abnormally in the PCD tools (A) to (C), in which the average grain sizes of the diamond powders used were relatively small (3 μm), compared to the PCD tool (D), in which the average grain size of the diamond powder was relatively large (9 μm); and the layer thickness of the Co rich layer was thickened in the PCD tools (A) and (B), in which the Co contents in the cemented carbide substrates used were relatively less (10% by mass), compared to the PCD tools (C) and (D), in which the Co contents in the cemented carbide substrates used were relatively high (16% by mass).

Table 2 shows the average layer thicknesses of the diamond layers; the average layer thicknesses of the Co rich layers; the average grain sizes D of the WC particles in the region from the interface between the cemented carbide substrate and the diamond layer to 50 μm inside of the diamond layer; the average grain sizes of the WC particles in the inside of the cemented carbide substrate; the values of $D/D_O$; and the average layer thickness of the buffer layer, of the PCD tools (A) to (D) and (G) of Comparative Examples, all of which were measured as in the PCD tools (E), (F), (H), (I), and (J) of Examples of the present invention.

In the samples (A) to (D) and (G) in Table 1, the Co content in the diamond raw material powder was zero, but by sintering, Co was infiltrated from the cemented carbide into the diamond layer. Thus, the amount of Co indicated as $C_{DIA}$ in Table 2 was included in the diamond layer.

Figure 4:
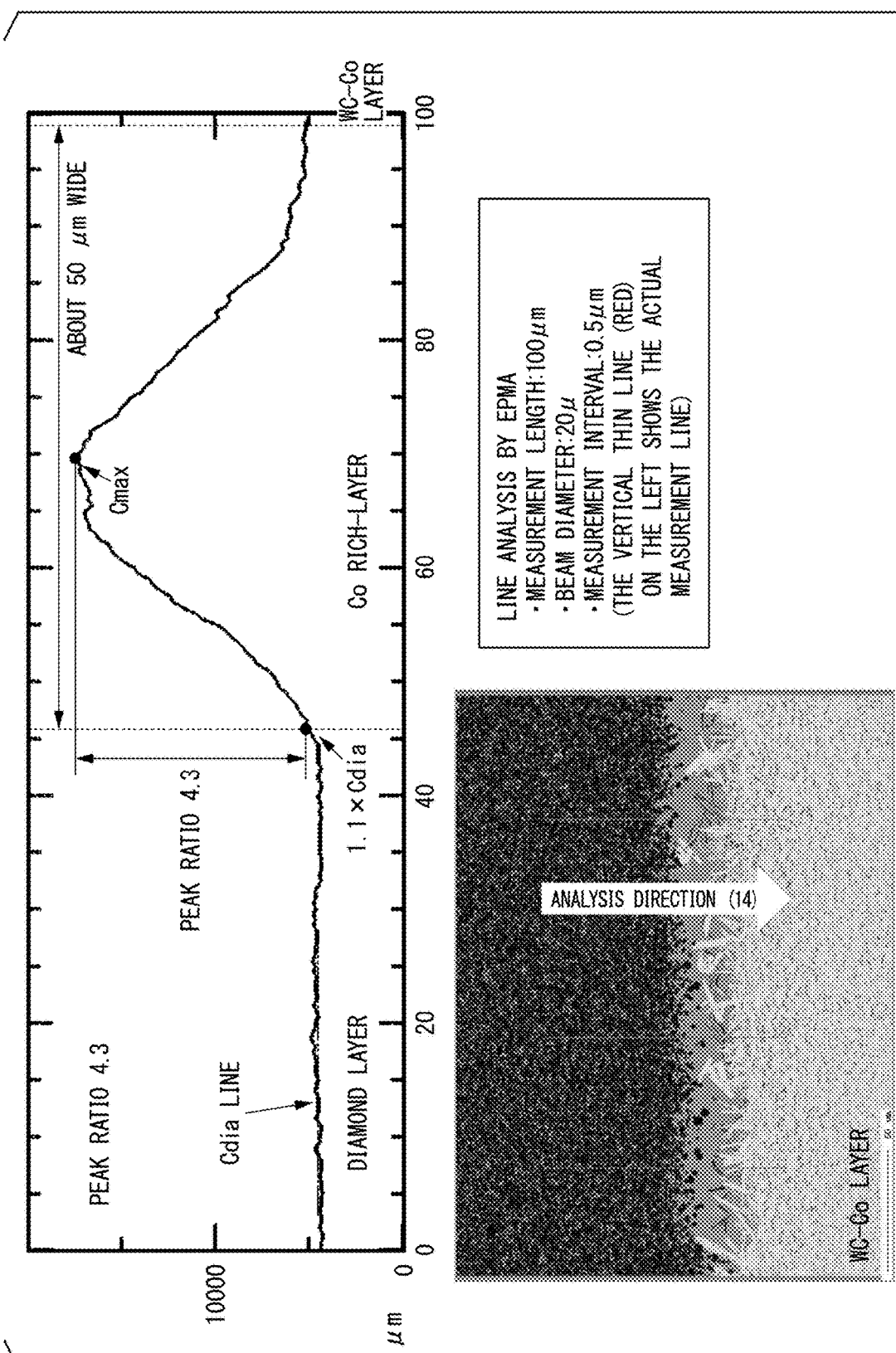
FIG. 4 shows a schematic explanatory view and analytical result of a line analysis of the Co content performed on the PCD tool (G) of Comparative Example.
Figure 5:
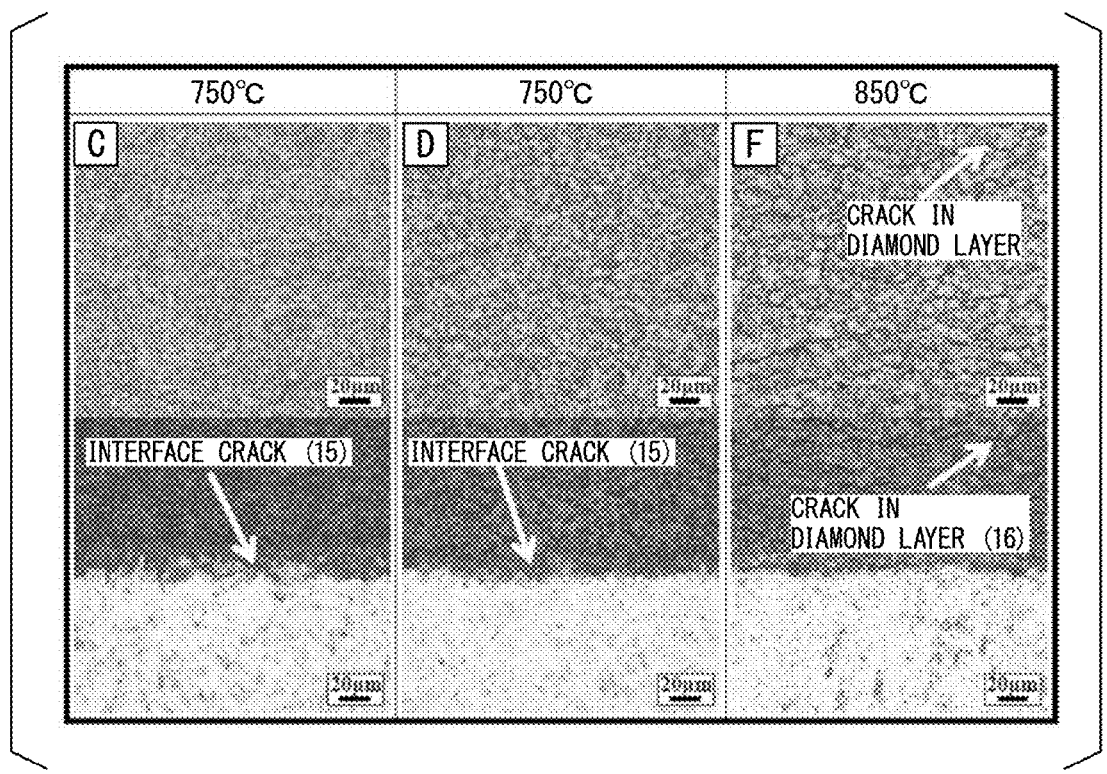
FIG. 5 shows SEM images of the diamond layer (upper layer), the cemented carbide substrate, and the diamond layer near the interface (lower layer) after performing a heat treatment test on the PCD tool. The panels (C) and (D) are SEM images of the PCD tools (C) and (D) of Comparative Examples after being subjected to heat treatment at 750° C. The panel (F) is a SEM image of the PCD tool (F) of Example of the present invention after being subjected to heat treatment at 850° C.
Figure 6:
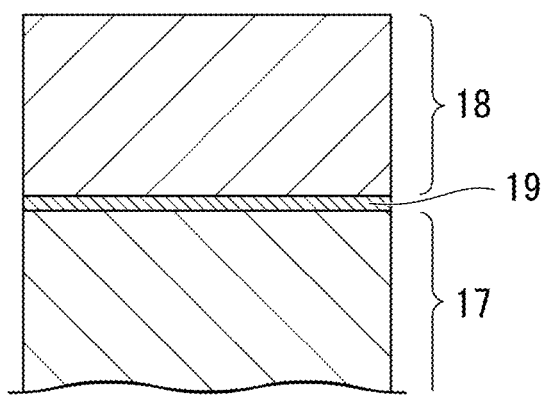
FIG. 6 shows a schematic vertical sectional view of a PCD tool according to an embodiment of the present invention.
Figure 7:
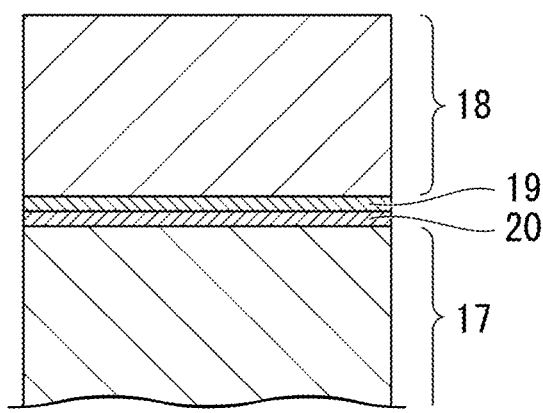
FIG. 7 is a schematic vertical sectional view of a PCD tool according to another embodiment of the present invention.

FIG. 4 shows a schematic explanation and analysis results of the line analysis performed on the PCD tool (G) of Comparative Example. It was demonstrated that the layer thickness of the Co rich layer was about 50 μm, and the value of $C_{MAX}/C_{DIA}$ was 4.3.

According to Table 2, in all of the PCD tools (A) to (D), (G) of Comparative Examples, the average layer thicknesses of the Co rich layers exceeded 30 μm. In addition, $D/D_O$ in the region from the interface between the cemented carbide substrate and the diamond layer to 50 μm inside of the diamond layer was 3-12. In addition, in all of the PCD tools (A) to (D), (G) of Comparative Examples, the average layer thicknesses of the diamond layers were less than 0.8 mm; and there was not buffer layer.

TABLE 2

| PCD tool type | $C_{DIA}$ | $C_{MAX}$ | $C_{MAX}/C_{DIA}$ | Average layer thickness of the diamond layer (mm) | Average layer thickness of the Co rich layer (μm) | D | $D_o$ | $D/D_o$ | Average layer thickness of the buffer layer (μm) | Impact shear strength (J/cm$^2$) | Remarks |
|---|---|---|---|---|---|---|---|---|---|---|---|
| A | 4406 | 17183 | 3.9 | 0.5 | 47 | 10.8 | 0.9 | 12.0 | 0 | 3.7 | Comparative Example |
| B | 3986 | 12755 | 3.2 | 0.5 | 42 | 10 | 3.3 | 3.0 | 0 | 4.0 | Comparative Example |
| C | 4271 | 11532 | 2.7 | 0.8 | 36 | 18 | 2.2 | 8.2 | 0 | 5.1 | Comparative Example |
| D | 2885 | 6347 | 2.2 | 0.8 | 31 | 16 | 2.2 | 7.3 | 0 | 4.7 | Comparative Example |
| E | 3684 | 4789 | 1.3 | 5.0 | 10 | 2.6 | 2.2 | 1.2 | 5 | 7.3 | Example of the present invention |
| F | 4181 | 6690 | 1.6 | 8.0 | 20 | 2.2 | 2.2 | 1.0 | 7 | 8.9 | Example of the present invention |
| G | 3907 | 16800 | 4.3 | 0.8 | 53 | 22 | 2.2 | 10.0 | 0 | 2.9 | Comparative Example |
| H | 5914 | 10054 | 1.7 | 6.0 | 20 | 3.2 | 2.2 | 1.5 | 9 | 10.2 | Example of the present invention |
| I | 5793 | 10028 | 1.7 | 6.0 | 21 | 3.3 | 2.2 | 1.5 | 9 | 11.4 | Example of the present invention |
| J | 5821 | 10721 | 1.8 | 6.0 | 23 | 3.1 | 2.2 | 1.4 | 9 | 12.1 | Example of the present invention |

Note:
"Co rich layer" means the region from the interface between the diamond layer and the WC-based cemented carbide to the diamond layer and having the Co content of $1.1 \times C_{DIA}$ or more.

Next, with respect to the PCD tools (E), (F), (H), (I), and (J) of Examples of the present invention; and the PCD tools (A) to (D), and (G) of Comparative Examples, heat treatment test was performed at 750° C.-850° C. for 60 minutes in order to evaluate the heat resistance, the cracking resistance and the peeling resistance.

For the PCD tools (A) to (D), and (G), occurrence of cracking and peeling was observed at the interface between the cemented carbide substrate and the diamond layer by heat treatment at 750° C. for 60 minutes.

On the contrary, in the PCD tools (E), (F), (H), (I), and (J) of Examples of the present invention, there was no occurrence of cracking or peeling at the interface between the cemented carbide substrate and the diamond layer in the heat treatment at 750° C. for 60 minutes.

In the PCD tools (E), (H), (I) and (J) of Examples of the present invention, the occurrence of cracking was observed for the first time at the interface between the cemented carbide substrate and the diamond layer by heat treatment at 800° C. for 60 minutes.

In the PCD tool (F) of Example of the present invention, cracking did not occur at the interface between the cemented carbide substrate and the diamond layer even by heat treatment at 850° C. for 60 minutes, but the occurrence of fine cracks in the diamond layer was observed.

It is assumed that the fine cracks were formed in the PCD tool (F) of Example of the present invention because: the temperature for heat resistance test was higher than the temperature in the PCD tools (A) to (D), and (G); and the PCD tools of (E), and (H) to (J); the heat stress of Co exceeded the bonding force between diamond particles; and as a result, the fine cracks were formed in the inside of the diamond layer itself In addition, for the PCD tools (E), (F), (H), (I), and (J) of Examples of the present invention; and the PCD tools (A) to (D), and (G) of Comparative Examples, the impact share strength test was performed in order to evaluate the resistance against peeling of the diamond layer due to an instantaneous impact. The results are shown in Table 2.

Figure 8:
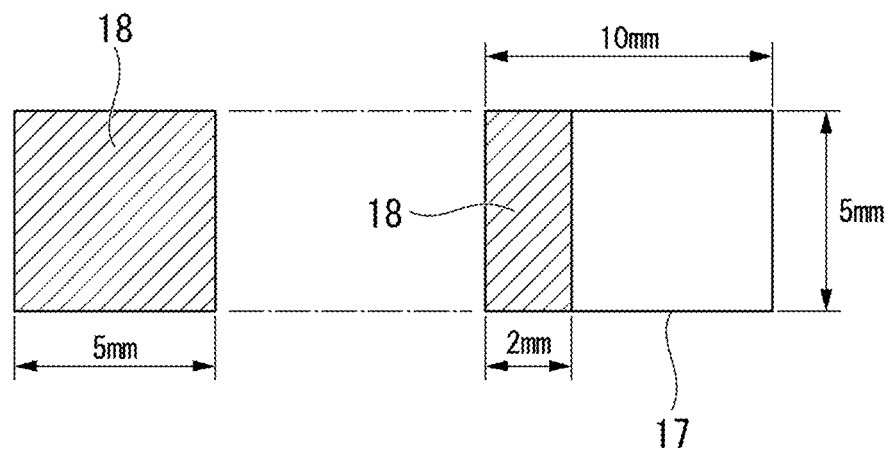
FIG. 8 shows a front view and a side view of a test piece used for evaluation of impact shear strength.

For the evaluation of the impact shear strength, testing pieces corresponding to the PCD tools (E), (F), (H), (I), and (J) of Examples of the present invention; and the PCD tools (A) to (D), and (G) of Comparative Examples, were prepared in the dimension shown in FIG. 8 and used.

Figure 9:
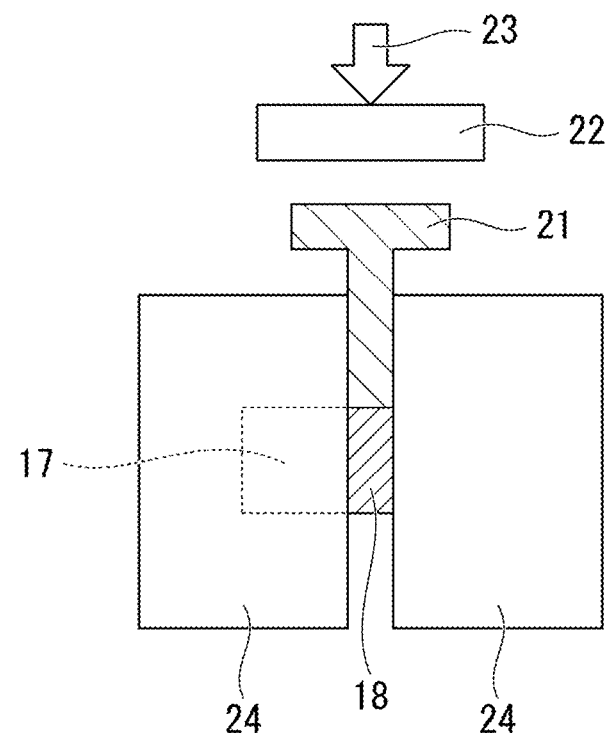
FIG. 9 shows a schematic cross-sectional view of a measuring apparatus used for evaluating impact shear strength. The state before dropping the weight is shown.
Figure 10:
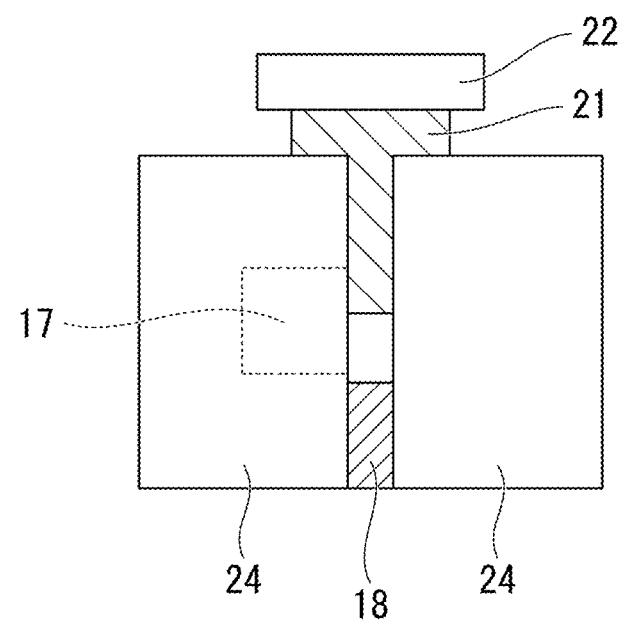
FIG. 10 shows a schematic cross-sectional view of a measuring apparatus used for evaluating impact shear strength. The state after dropping the weight is shown.

The testing pieces were fixed to the testing piece fixing jig (25) shown in FIG. 9 via the clamp (24) on the WC-Co layer side. The hammer (21) was set so that its lower end abuts the diamond layer (18) of the test piece. Then, the weight (22) of a predetermined mass (kg) was dropped from a predetermined height on the upper end of the hammer (21). FIG. 10 shows a state in which the diamond layer (18) is broken by the falling of the weight (22).

If the diamond layer (18) does not break (peeled off from the cemented carbide substrate (17), the drop height of the weight (22) was increased and retested. When breaking occurred, the falling weight energy (J) at that time was taken as the impact shear strength.

The falling weight energy is obtained from the formula of falling weight energy (J)=mass of weight (kg)×gravity constant (ms$^{-2}$)×height (m).

The shear strength (J/cm$^2$) was obtained from the equation of shear strength (J/cm$^2$)=drop weight energy (J) at breakage/testing piece cross-sectional area (cm$^2$).

From Table 2, it was demonstrated that in the PCD tool (E), (F), (H), and (I) of Example of the present invention, impact shearing strength (J) was 7.3 J/cm$^2$ to 12.1 J/cm$^2$. In the PCD tools (H), (I) and (J) of Examples of the present invention including the buffer layer having the average layer thickness of 5 μm or more and 15 μm or less, the impact shear strength exhibited the value of about 10 J/cm$^2$ or more. In particular, the PCD tools (I) and (J) of Example of the present invention showed high impact shear strength.

On the other hand, in the PCD tools (A) to (D), and (G) of Comparative Examples, the impact shear strength (J/cm$^2$) against the peeling of the diamond layer (18) due to the instantaneous impact was 2.9 J/cm$^2$ to 5.1 J/cm$^2$, which was significantly lower than the impact shear strength in the PCD tools (E), (F), (H), (I), and (J) of Examples of the present invention.

FIG. 3 shows SEM images obtained in the PCD tools (C) and (D) of Comparative Example; and the PCD tool (F) of Example of the present invention after the heat treatment test.

As clearly demonstrated in results shown in Table 3, the PCD tools (E), (F) and (H) of Examples of the present invention, in which the average layer thicknesses of the Co rich layers formed at the interfaces between the cemented carbide substrates and the diamond layers were suppressed to 30 μm or less, and the average grain size D of the WC particles in the region from the interface between the cemented carbide substrate and the diamond layer to 50 μm inside of the diamond layer satisfied the formula $D/D_O<2$ with respect to the average grain size $D_O$ of the WC particles in the inside of the cemented carbide substrate, had excellent heat resistance and impact resistance; and excellent cracking resistance and peeling resistance.

INDUSTRIAL APPLICABILITY

As described above, the PCD tool of the present invention has excellent interface bonding strength and excellent heat resistance/impact resistance in addition to excellent hardness, thermal conductivity, and chemical stability that ordinary PCD tools have. Thus, it is used as a long-life PCD tool for cutting of non-ferrous metals, cemented carbide, ceramics and the like; or for petroleum/natural gas/geothermal well drilling and the like.

REFERENCE SINGS LIST

1: WC-Co base material (cemented carbide substrate)
2: Graphite disc
3: Graphite
4: Heater
5: Steel ring
6: Ta foil
7: NaCl-10 wt % $ZrO_2$
8: Diamond powder or (diamond+Co) mixed powder
9: Ta capsule
10: Co rich layer
11: WC particles (white)
12: Co (gray)
13: Diamond particles (black)
14: Analysis direction
15: Interface crack
16: Crack in diamond layer
17: Cemented carbide substrate
18: Diamond layer
19: Co rich layer
20: Buffer layer
21: Hammer
22: Weight
23: Fall
24: Clamp
25: Test piece fixing jig

What is claimed is:

1. A polycrystalline diamond sintered material tool comprising:
    a cemented carbide substrate, which is mainly composed of WC and includes Co; and
    a diamond layer containing a metal catalyst made of Co provided on the cemented carbide substrate, wherein
    an average layer thickness of a Co rich formed in an interface between the cemented carbide substrate and the diamond layer is 30 μm or less, and
    an average layer thickness of the diamond layer is from 2.0 mm to 15 mm.

2. The polycrystalline diamond sintered material tool according to claim 1, wherein
    a value of $C_{MAX}/C_{DIA}$ is 2 or less when $C_{DIA}$ is defined as an average content of Co included in the diamond layer and $C_{MAX}$ is defined as a peak value of a Co content in the Co rich layer.

3. The polycrystalline diamond sintered material tool according to claim 1, wherein
    a value of $D/D_O$ is less than 2 when D is defined as average grain size of WC particles in a region from the interface between the cemented carbide substrate and the diamond layer to 50 μm toward an inside of the diamond layer; and $D_O$ is defined as an average grain size of WC particles in the inside of the cemented carbide substrate.

4. The polycrystalline diamond sintered material tool according to claim 1, wherein a value, in which an average content of Co in the cemented carbide substrate is subtracted from a Co mixed amount, is from 1% by mass to 30% by mass, the Co mixed amount being a Co amount mixed in the diamond layer prior to sintering.

5. The polycrystalline diamond sintered material tool according to claim 4, wherein a value, in which an average content of Co in the cemented carbide substrate is subtracted from a Co mixed amount, is from 10% by mass to 30% by mass, the Co mixed amount being a Co amount mixed in the diamond layer prior to sintering.

6. The polycrystalline diamond sintered material tool according to claim 5, wherein a value, in which an average content of Co in the cemented carbide substrate is subtracted from a Co mixed amount, is from 16% by mass to 28% by mass, the Co mixed amount being a Co amount mixed in the diamond layer prior to sintering.

7. The polycrystalline diamond sintered material tool according to claim 4, further comprising a buffer layer with an average layer thickness of 5 μm or more and 15 μm or less at the interface between the Co rich layer and the cemented carbide substrate.

8. The polycrystalline diamond sintered material tool according to claim 4, further comprising a buffer layer with an average layer thickness of 8 μm or more and 15 μm or less at the interface between the Co rich layer and the cemented carbide substrate.

9. The polycrystalline diamond sintered material tool according to claim 8, wherein the average layer thickness of the Co rich layer is 21 μm or more.

10. The polycrystalline diamond sintered material tool according to claim 7, wherein
    the diamond layer is formed directly on the Co rich layer,
    the Co rich layer is formed directly on the buffer layer, and
    the buffer layer is formed directly on the cemented carbide substrate.

11. The polycrystalline diamond sintered material tool according to claim 1, wherein
    the polycrystalline diamond sintered material tool exhibits impact shearing strength in a range of 7.3 $J/cm^2$ to 12.1 $J/cm^2$, said impact shear strength being obtained by dividing a drop weight energy by a breakage/testing piece cross-sectional area.

* * * * *